(12) United States Patent
Oosthuyzen

(10) Patent No.: US 10,383,326 B2
(45) Date of Patent: Aug. 20, 2019

(54) POWER LINE PROTECTION DEVICE

(71) Applicant: PREFORMED LINE PRODUCTS, Mayfield Village, OH (US)

(72) Inventor: William Lawrence Oosthuyzen, New Germany (ZA)

(73) Assignee: PREFORMED LINE PRODUCTS, CO., Mayfield Village, OH (US)

( * ) Notice: Subject to any disclaimer, the term of this patent is extended or adjusted under 35 U.S.C. 154(b) by 315 days.

(21) Appl. No.: 15/038,156

(22) PCT Filed: Nov. 24, 2014

(86) PCT No.: PCT/US2014/067122
§ 371 (c)(1),
(2) Date: May 20, 2016

(87) PCT Pub. No.: WO2015/077705
PCT Pub. Date: May 28, 2015

(65) Prior Publication Data
US 2016/0286784 A1    Oct. 6, 2016

(30) Foreign Application Priority Data

Nov. 22, 2013 (ZA) ................................. 2013/08801

(51) Int. Cl.
*A01M 29/08* (2011.01)
*H02G 7/00* (2006.01)
*A01M 29/10* (2011.01)

(52) U.S. Cl.
CPC ............ *A01M 29/08* (2013.01); *A01M 29/10* (2013.01); *H02G 7/00* (2013.01)

(58) Field of Classification Search
None
See application file for complete search history.

(56) References Cited

U.S. PATENT DOCUMENTS

| | | | | |
|---|---|---|---|---|
| 2,030,491 A | * | 2/1936 | Abadie | B64F 1/20 313/312 |
| 5,208,577 A | | 5/1993 | Herzberg | |
| 5,372,335 A | * | 12/1994 | Yenzer | G08B 5/00 116/209 |
| 5,537,111 A | * | 7/1996 | Martin | B64F 1/18 315/364 |
| 5,808,424 A | | 9/1998 | Osgood | |

FOREIGN PATENT DOCUMENTS

WO         9415323         7/1994

OTHER PUBLICATIONS

Int. Search Report cited in corresponding PCT Application No. PCT/US2014/067122 dated Mar. 11, 2015, 10 pgs.

* cited by examiner

*Primary Examiner* — Dimary S Lopez Cruz
(74) *Attorney, Agent, or Firm* — Cooper Legal Group, LLC

(57) ABSTRACT

A power line protection device protects a power line from avifauna. The power line protection device includes at least two of an attachment portion attached to the power line, the attachment portion having a helical turn that winds around the power line, a lighting apparatus for emitting light, or a reflective device having a reflective material that reflects light. The lighting apparatus is attached to at least one of the attachment portion or the reflective device. The reflective device is attached to at least one of the attachment portion or the lighting apparatus. A method for protecting a power line from avifauna is provided.

20 Claims, 4 Drawing Sheets

POWER LINE PROTECTION DEVICE

CROSS-REFERENCE TO RELATED APPLICATIONS

This application claims priority to South African provisional patent application number 2013/08801 filed on Nov. 22, 2013 titled "AVIAN WARNING DEVICE," the entire disclosure of which is herein incorporated by reference in its entirety.

TECHNICAL FIELD

The instant application is directed towards a power line protection device. For example, the instant application is directed towards a power line protection device for protecting avifauna (e.g., birds, bats, and other flying creatures) from power lines.

BACKGROUND

A power line protection device can be used for protecting a power line. In an example, a power line protection device can be used for protecting avifauna (e.g., birds, bats, and other flying creatures) from coming into contact with power lines.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In an example, a power line protection device for protecting a power line from avifauna is provided. The power line protection device comprises at least two of an attachment portion configured to be attached to the power line, the attachment portion comprising a helical turn that winds around the power line, a lighting apparatus configured to emit light, or a reflective device comprising a reflective material that is configured to reflect light. The lighting apparatus is attached to at least one of the attachment portion or the reflective device. The reflective device is attached to at least one of the attachment portion or the lighting apparatus.

In another example, a power line protection device for protecting a power line from avifauna is provided. The power line protection device comprises an attachment portion configured to be attached to the power line. The power line protection device comprises a lighting apparatus configured to emit light. The power line protection device comprises a reflective device comprising a reflective material that is configured to reflect light. The lighting apparatus is attached to at least one of the attachment portion or the reflective device. The reflective device is attached to at least one of the attachment portion or the lighting apparatus.

In another example, a method for protecting a power line from avifauna is provided. The method comprises attaching an attachment portion to the power line. The attachment portion comprises a helical turn that winds around the power line. The method comprises attaching a lighting apparatus to at least one of the attachment portion or a reflective device. The lighting apparatus is configured to emit light. The method comprises attaching the reflective device to at least one of the attachment portion or the lighting apparatus. The reflective device comprises a reflective material that is configured to reflect light.

The following description and annexed drawings set forth certain illustrative aspects and implementations. These are indicative of but a few of the various ways in which one or more aspects can be employed. Other aspects, advantages, and/or novel features of the disclosure will become apparent from the following detailed description when considered in conjunction with the annexed drawings.

DETAILED DESCRIPTION

Figure 1:
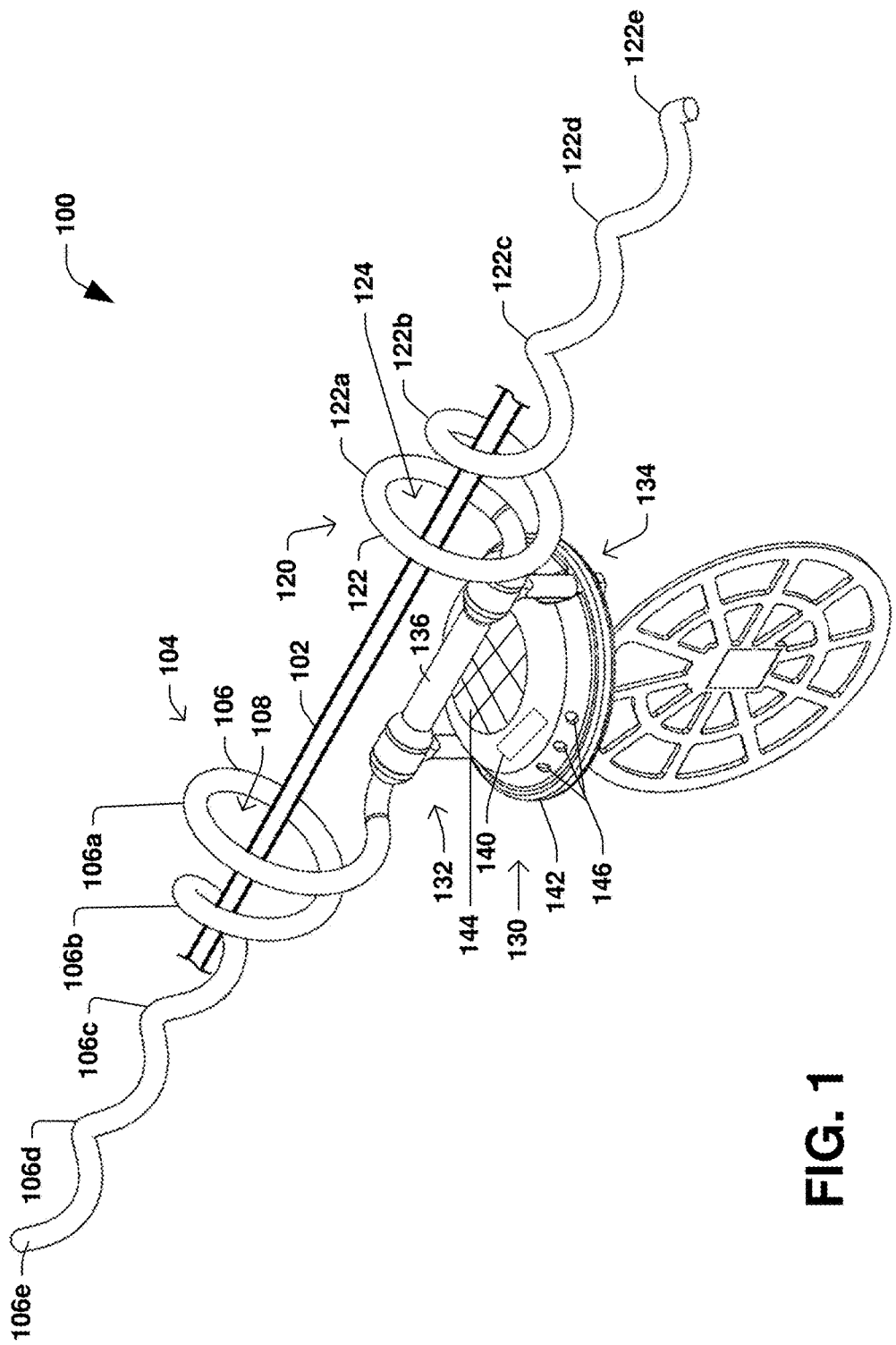
FIG. 1 is an illustration of at least some of an example power line protection device.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

A power line protection device 100 can be provided for protecting a power line from animals and/or for protecting animals from a power line. In an example, the animals comprise airborne animals, such as birds, bats, etc. In some examples, the animals may be airborne during the day and/or at night. To limit the animals from contacting a power line 102, the power line protection device 100 is provided. The power line protection device 100 is effective in deterring avifauna (e.g., birds, bats, and other flying creatures) from flying into the power line 102 during the day and/or at night. For example, the power line protection device 100 can emit light, so as to deter avifauna (e.g., birds, bats, and other flying creatures) at night. Additionally, the power line protection device 100 is conspicuous during the day and can reflect light, so as to deter animals during the day.

In some examples, the power line protection device 1000 may be brightly colored, such as by having an orange color, red color, etc. However, these bright colors may not be visible in low light conditions (e.g., dawn, dusk, night time). As such, one or more structures, components, etc. may be provided for reflecting and/or emitting light, with this reflected and/or emitted light being visible in low light conditions and during the day.

The power line protection device 100 can be attached to one or more power lines 102. In an example, the power line 102 may be used in electric power transmission and to transmit electrical energy. The power line 102 can comprise one or more conductors that are suspended by towers and/or poles.

The power line protection device 100 comprises an attachment portion 104 configured to be attached to the power line 102. The attachment portion 104 can comprise one or more helical turns 106 that wind around the power line 102. In an example, the helical turns 106 comprise a plurality of helical turns, in which a first helical turn 106a defines a different cross-sectional size (e.g., diameter defined within the first helical turn 106a) than other helical turns (e.g., 106b) of the attachment portion 104. In the illustrated example, a cross-sectional size of the helical turns may be progressively smaller from the first helical turn 106a to successive helical turns (e.g., 106b) in a direction away from a center of the power line protection device 100. In some examples, the helical turns 106 define an attachment opening 108 within which the power line 102 can extend. The helical turns 106c, 106d, 106e at the end of the attachment portion 104 opposite the first helical turn 106a can have a cross-sectional size that substantially matches or is slightly larger than a cross-sectional size of the power line 102, such that the helical turns 106c, 106d, 106e can contact and/or grip the power line 102.

The power line protection device 100 comprises a second attachment portion 120 configured to be attached to the power line 102. The second attachment portion 120 can be similar in structure to the attachment portion 104. For example, the second attachment portion 120 comprises one or more second helical turns 122 that wind around the power line 102. In an example, the second helical turns 122 comprise a plurality of second helical turns, in which a first one of the second helical turns 122a defines a different cross-sectional size (e.g., diameter defined within the second helical turn 122a) than other helical turns (e.g., 122b) of the second attachment portion 120. In some examples, the attachment portion 104 and the second attachment portion 120 comprise similar materials, such as plastic materials, plastic extruded materials, polyvinyl chloride (PVC) extruded materials, etc.

In the illustrated example, a cross-sectional size of the second helical turns may be progressively smaller from the second helical turn 122a to successive helical turns (e.g., 122b, 122c, 122d, 122e) in a direction away from a center of the power line protection device 100. In some examples, the second helical turns 122 define a second attachment opening 124 within which the power line 102 can extend. The second helical turns 122c, 122d, 122e at the end of the second attachment portion 120 opposite the first one of the second helical turns 122a can have a cross-sectional size that substantially matches or is slightly larger than a cross-sectional size of the power line 102, such that the second helical turns 122c, 122d, 122e can contact and/or grip the power line 102.

In some examples, the attachment portion 104 and the second attachment portion 120 can be spaced apart from each other. In such an example, the first helical turn 106a of the attachment portion 104 can be spaced a distance apart from the second helical turn 122a of the second attachment portion 120. In such an example, the attachment portion 104 and the second attachment portion 120 can separately wind around the power line 102, such that the attachment portion 104 and the second attachment portion 120 can be separately attached to the power line 102.

In an example, the helical turns 106 of the attachment portion 104 and the second helical turns 122 of the second attachment portion 120 can have a similar number of revolutions around the power line 102. In an example, the helical turns 106 and the second helical turns 122 comprises between about 3 to 6 revolutions around the power line 102. In such an example, the outermost (e.g., farthest away from a center of the power line protection device 100) 2 to 3 revolutions of the helical turns 106 and the second helical turns 122 can have a substantially constant diameter. In some examples, these outermost 2 to 3 revolutions can wrap tightly around the power line 102, so as to secure the power line protection device 100 to the power line 102.

In this example, the helical turns 106 of the attachment portion 104 have an opposite orientation with respect to the second helical turns 122 of the second attachment portion 120. For example, the first helical turn 106a can wind around the wire in a first direction (e.g., clockwise or counter-clockwise) while the second helical turn 122a can wind around the wire in an opposing second direction (e.g., counter-clockwise or clockwise). This opposite orientation of the helical turns 106, 122 is beneficial, at least in part, so that rotation of the power line protection device 100 around the power line 102 is unlikely to cause inadvertent detachment of the power line protection device 100 from the power line 102.

The power line protection device 100 comprises a lighting apparatus 130 configured to emit light. The lighting apparatus 130 can be attached to the attachment portion 104 and the second attachment portion 120. In such an example, the lighting apparatus 130 can be positioned between the attachment portion 104 and the second attachment portion 120.

The lighting apparatus 130 can be attached with respect to the attachment portion 104 and the second attachment portion 120. In an example, a first mounting structure 132 can be attached to the lighting apparatus 130 and to the attachment portion 104. A second mounting structure 134 can be attached to the lighting apparatus 130 and to the second attachment portion 120. A mounting connector 136 can extend between the first mounting structure 132 and the second mounting structure 134 so as to connect the attachment portion 104 and the second attachment portion 120. In this example, the lighting apparatus 130 can hang (e.g., hang vertically underneath due to the forces of gravity) from the attachment portion 104 and the second attachment portion 120. As such, in the event of inadvertent rotation of the attachment portion 104 and the second attachment portion 120, the lighting apparatus 130 can remain hanging substantially vertically underneath the power line 102.

The lighting apparatus 130 comprises a power source 140. The power source 140 is illustrated in dashed lines in FIG. 1 because the power source 140 may not be visible in such a view and may be located within a housing 142. In an example, the power source 140 can supply electric energy to one or more components, devices, etc. within the power line protection device 100. In the illustrated example, the power source 140 can comprise batteries (e.g., rechargeable batteries), fuel cells, generators, alternators, power convertors, other types of energy storage devices, etc. In an example, the lighting apparatus 130 comprises the housing 142 that supports the power source 140. In some examples, the housing 142 is at least partially hollow, such that the power source 140 can be supported within the housing 142, thereby protecting the power source 140 from the elements (e.g., rain, snow, particulates, sun, etc.).

The lighting apparatus 130 comprises one or more solar panels 144. The solar panels 144 can be supported at an exterior surface of the housing 142, such that the solar panels 144 may be exposed to light (e.g., sunlight). In the illustrated example, the solar panels 144 can be positioned at an upper exterior surface of the housing 142, though, in other examples, the solar panels 144 could be positioned at other examples, such as along side surfaces of the housing 142, bottom surface, etc. By positioning the solar panels 144 at the upper exterior surface of the housing 142, the solar panels 144 can be exposed to light (e.g., sunlight) during the day.

The solar panels 144 can be in operative association with the power source 140, such as by being electrically connected to the power source 140. In this example, the solar panels 144 can convert light energy (e.g., photons) from the sunlight to generate electricity based on the photovoltaic effect. This electricity generated by the solar panels 144 can be transmitted to the power source 140, so as to charge and/or recharge the power source 140, such as when the power source 140 comprises a rechargeable battery. The lighting apparatus 130 is not limited to incorporating the solar panels 144 as a means for recharging the power source 140. Rather, in other examples, the lighting apparatus 130 may comprise a wind turbine in addition to or in the alternative of the solar panels 144. In such an example, the wind turbine can convert kinetic energy from wind into electricity, whereby this electricity is transmitted to the power source 140 to charge and/or recharge the power source 140.

The lighting apparatus 130 comprises one or more lights 146. In an example, the lights 146 are supported at an exterior surface of the housing 142. In this example, three lights 146 are illustrated as being supported on a side wall/surface of the housing 142. However, such a position and number of lights 146 is not intended to be limiting. Rather, in other examples, the lights 146 can be positioned at an upper exterior surface of the housing 142, along opposing surfaces of the housing 142, and/or along a bottom surface of the housing 142. In some examples, the one or more lights 146 comprise LEDs. In another example, three lights (e.g., LEDs) 146 can be positioned on one side of the housing 142 while three lights (e.g., LEDs) 146 can be positioned on an opposite side of the housing 142.

The lights 146 can be in operative association with the power source 140, such as by being electrically connected to the power source 140 and/or to the solar panels 144. For example, electrical energy can be transmitted from the power source 140 and/or from the solar panels 144 to the lights 146. In an example, the power source 140 can be charged by the solar panels 144. With the power source 140 charged, the power source 140 can power the lights 146 during the night, at dawn, and/or at dusk, such that the lights 146 may be visible to airborne animals. In other examples, the lights 146 may be powered during the day, such as by being powered by the power source 140 and/or the solar panels 144. In these examples, the lights 146 may be illuminated during the day and/or during the night.

Figure 2:
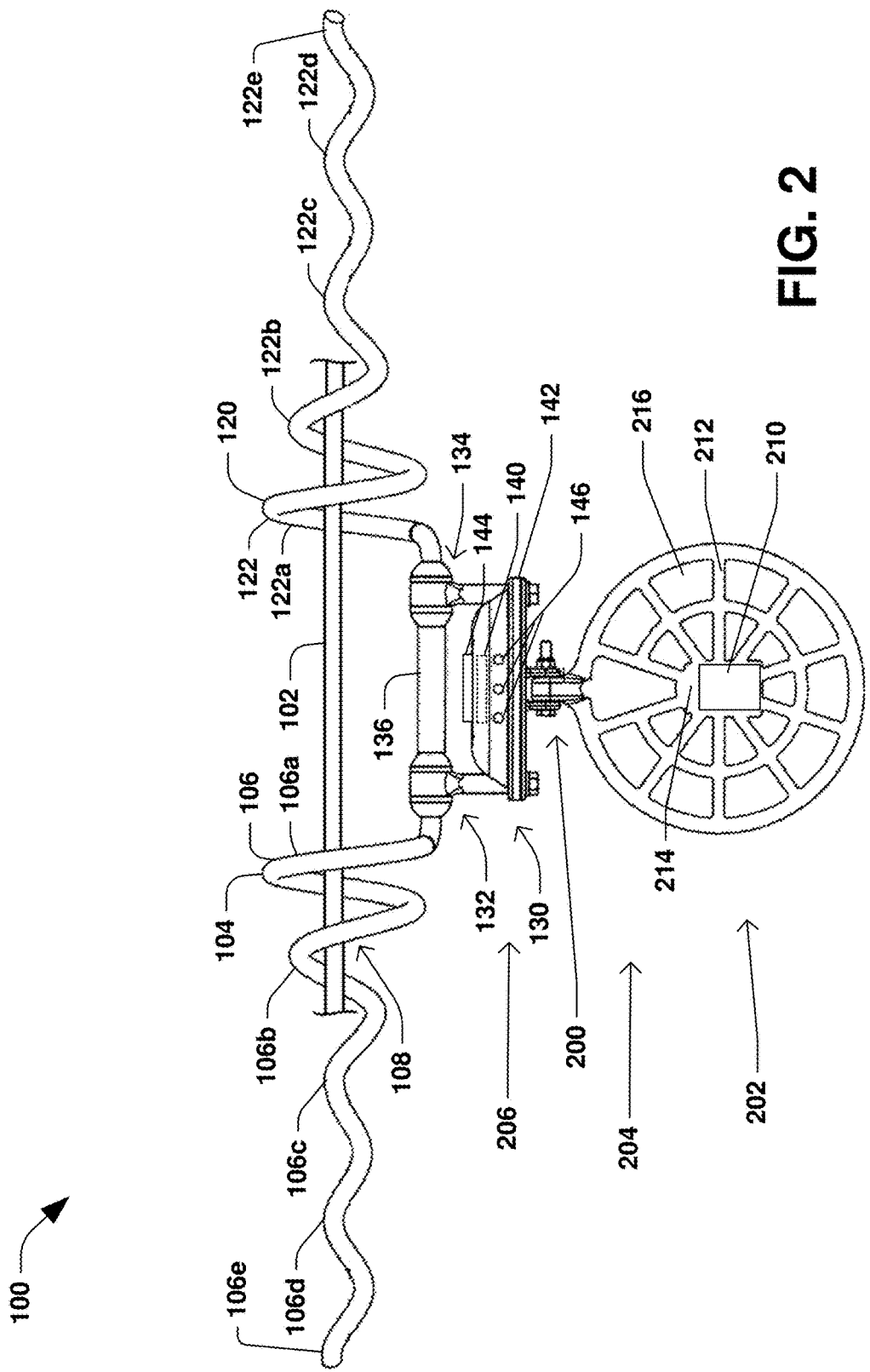
FIG. 2 is an illustration of at least some of an example power line protection device.

Turning to FIG. 2, a side view of the power line protection device 100 is illustrated. In this example, the power line protection device 100 comprises a third mounting structure 200 for attaching a reflective device 202 to the lighting apparatus 130. In this example, the third mounting structure 200 is attached to a lower surface of the housing 142 that is opposite the solar panels 144. In this example, the reflective device 202 is attached to the lighting apparatus 130 such that the reflective device 202 is disposed on a first side 204 of the lighting apparatus 130 while the attachment portion 104 and the second attachment portion 120 are disposed on a second side 206 of the lighting apparatus 130.

The reflective device 202 comprises a reflective material 210 that is configured to reflect light. In an example, the reflective device 202 comprises an outer region 212 and a central region 214. As illustrated, the reflective device 202 can have a substantially circular shape, though, in other examples, other shapes are envisioned, such as a quadrilateral shape (e.g., square, rectangular, etc.), an oval shape, a triangular shape, etc. As such, in this example, the outer region 212 is defined at an outer radial region of the reflective device 202 while the central region 214 is defined at an inner radial region of the reflective device 202 towards the center of the reflective device 202.

The outer region 212 of the reflective device 202 comprises one or more openings 216. The openings 216 can reduce a weight of the reflective device 202 while allowing for the reflective device 202 to move with respect to the lighting apparatus 130. The reflective device 202 is not limited to comprising the illustrated openings, and, in other examples, may comprise more openings 216 than as illustrated, fewer openings 216 than as illustrated, or zero openings. In an example, the reflective device 202 comprises a plastic material, such as polyethylene, though other materials are envisioned that allow for the reflective device 202 to move with respect to the lighting apparatus 130, such as in response to wind.

The reflective material 210 is disposed at the central region 214 of the reflective device 202. The reflective material 210 can comprise, for example, a mirror, reflector, or other material that reflects light in one or more directions. The reflective material 210 comprises any number of colors, including, but not limited to, yellow reflective materials, red reflective materials, etc. Additionally, while one reflective material 210 is illustrated, any number (e.g., one or more) of reflective materials 210 may be provided as part of the reflective device 202, with these reflective materials 210 disposed at either or both of the central region 214 or the outer region 212.

In operation, the reflective material 210 can reflect light (e.g., sunlight, light generated by the lighting apparatus 130, etc.). As such, during the daytime, dawn, and/or dusk, light may be reflected by the reflective material 210, with this light being visible to airborne animals. Accordingly, the airborne animals may be deterred from landing on the power line 102 and/or may avoid the power line protection device 100 as a result of visually perceiving this light that is reflected by the reflective material 210.

Figure 3:
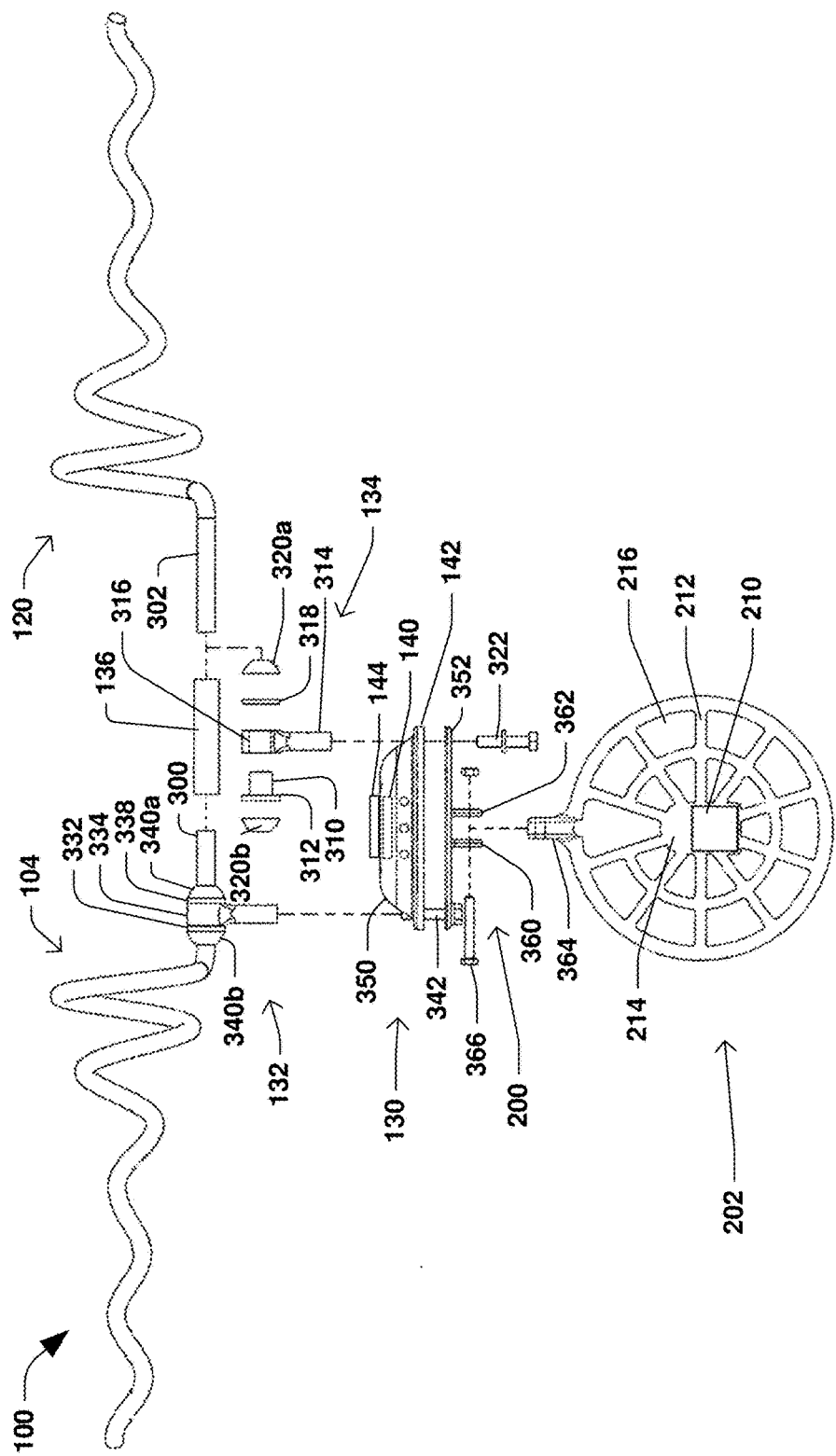
FIG. 3 is an illustration of at least some of an example power line protection device.

Turning to FIG. 3, the power line protection device 100 is illustrated with one or more of the mounting structures in a partially exploded state for illustrative purposes. In this example, the mounting connector 136 extends in a direction that is substantially parallel with respect to a direction along which the power line 102 extends. The mounting connector 136 may be substantially hollow and positioned between the attachment portion 104 and the second attachment portion 120. The mounting connector 136 is sized and shaped to receive a first helical end 300 of the attachment portion 104 at a first end of the mounting connector 136. The mounting connector 136 is sized and shaped to receive a second helical end 302 of the second attachment portion 120 at a second end of the mounting connector 136.

In these examples, the first helical end 300 and the second helical end 302 have a cross-sectional size that is less than a cross-sectional size of the mounting connector 136. As such, the first helical end 300 and the second helical end 302 can be received within the mounting connector 136. In an example, the first helical end 300 can have a reduced cross-sectional size as compared to other portions of the attachment portion 104 (e.g., at the helical turns 106). Similarly, the second helical end 302 can have a reduced cross-sectional size as compared to other portions of the second attachment portion 120 (e.g., at the second helical turns 122).

Focusing upon the second mounting structure 134, the second mounting structure 134 comprises a second bearing 310. The second bearing 310 is substantially hollow and can define an opening into which the second helical end 302 can be received. The second bearing 310 comprises a shoulder 312 at an end of the second bearing 310. The shoulder 312 has an increased cross-sectional size as compared to other portions of the second bearing 310.

The second mounting structure 134 comprises a second connector arm 314. The second connector arm 314 defines a second opening 316 into which the second bearing 310 and the second helical end 302 can be received. The second connector arm 314 extends in a direction that is substantially perpendicular to a direction along which the second helical end 302 extends. The second connector arm 314 is elongated, such that a top end of the second connector arm 314 defines the second opening 316, while a bottom end of the second connector arm 314 can be attached to the lighting apparatus 130. In an example, when the second connector arm 314 receives the second bearing 310 within the second opening 316, the shoulder 312 can contact and/or engage the second connector arm 314.

The second mounting structure 134 comprises a second washer 318. The second washer 318 can contact and/or engage the second connector arm 314 on an opposite side of the second connector arm 314 from the shoulder 312. The second washer 318 can act as a spacer and/or can assist in distributing a load/force. The second washer 318 can be positioned between the second connector arm 314 on one side and a second locking ring 320a on an opposing side. In an example, the second washer 318 and the second locking ring 320a define openings through which the second helical end 302 can extend.

In some examples, the second mounting structure 134 comprises two second locking rings 320a, 320b. A second locking ring 320b can be positioned adjacent and in contact with the shoulder 312 opposite the second connector arm 314. In such an example, the second locking ring 320b defines an opening through which the second helical end 302 can extend. In this example, the second locking rings 320a, 320b can be spaced apart from each other, with the second bearing 310, the second connector arm 314, and the second washer 318 positioned in between. In operation, the second helical end 302 can extend through the second locking ring 320a, the second washer 318, the second connector arm 314, the second bearing 310, and the second locking ring 320b. In this example, the second mounting structure 134, once attached to the second helical end 302, can hang vertically from the second helical end 302 and, in an example, can move, swing, etc. with respect to the second helical end 302 of the second attachment portion 120.

Referring to the first mounting structure 132, the first mounting structure 132 is illustrated in an assembled state. The first mounting structure 132 is similar in a number of ways to the second mounting structure 134. For example, the first mounting structure 132 can receive the first helical end 300 of the attachment portion 104. The first mounting structure 132 comprises a first bearing 330, a shoulder 332, a first connector arm 334, a first opening 336, a first washer 338, and a first locking ring 340a, 340b. In an example, the first bearing 330 is substantially similar to the second bearing 310. In an example, the shoulder 332 is substantially similar to the shoulder 312. In an example, the first connector arm 334 and the first opening 336 are substantially similar to the second connector arm 314 and the second opening 316. In an example, the first washer 338 is substantially similar to the second washer 318. In an example, the first locking rings 340a, 340b are substantially similar to the second locking rings 320a, 320b.

In this example, the first mounting structure 132, once attached to the first helical end 300, can hang vertically from the first helical end 300. In such an example, the first mounting structure 132 can move, swing, etc. with respect to the first helical end 300 of the attachment portion 104.

The first mounting structure 132 and the second mounting structure 134 can be attached to the housing 142 of the lighting apparatus with one or more fasteners. For example, a second fastener 322 can extend through one or more openings in the housing 142, with the second fastener 322 attached to the second connector arm 314. In the illustrated example, the second fastener 322 can extend through openings in a first housing portion 350 and a second housing portion 352 of the housing 142. The second fastener 322 can be attached to the second connector arm 314, such as by threadingly engaging the second connector arm 314. As such, the second fastener 322 can attach the second connector arm 314 of the second mounting structure 134 to the housing 142.

A first fastener 342 can extend through one or more openings in the housing 142, with the first fastener 342 attached to the first connector arm 334. In the illustrated example, the first fastener 342 can extend through openings in the first housing portion 350 and the second housing portion 352 of the housing 142. The first fastener 342 can be attached to the first connector arm 334, such as by threadingly engaging the first connector arm 334. As such, the first fastener 342 can attach the first connector arm 334 of the first mounting structure 132 to the housing 142.

The first housing portion 350 and the second housing portion 352 can be removably attached to form the housing 142. In an example, the first housing portion 350 and the second housing portion 352 can, together, define an interior of the housing 142 into which the power source 140 can be received. As illustrated in FIG. 3, the first housing portion 350 and the second housing portion 352 can be detached, such that the power source 140 can be accessed (e.g., to service the power source 140, to replace the power source 140, etc.). As illustrated in FIGS. 1 and 2, the first housing portion 350 and the second housing portion 352 can be attached to each other, such as with one or more fasteners (e.g., the first fastener 342 and the second fastener 322). With the first housing portion 350 and the second housing portion 352 attached to each other, access to the power source 140 is limited.

Referring to the third mounting structure 200, the third mounting structure 200 is illustrated in a partially exploded state for illustrative purposes. The third mounting structure 200 can attach the reflective device 202 to the lighting apparatus 130. In the illustrated example, the third mounting structure 200 comprises a first mounting extension 360 and a second mounting extension 362. The first mounting extension 360 and the second mounting extension 362 project outwardly from a bottom surface of the second housing portion 352 of the housing 142. In this example, the first mounting extension 360 and the second mounting extension 362 are spaced apart from each other to define a gap, space, opening, channel, passageway, etc. there between. The first mounting extension 360 and the second mounting extension 362 can define openings so as to receive a fastener, such as a third fastener 366, through the first mounting extension 360 and the second mounting extension 362.

The reflective device 202 comprises a third mounting extension 364. The third mounting extension 364 can project outwardly (e.g., upwardly0 from an upper surface of the reflective device 202. The third mounting extension 364 can project upwardly towards the lighting apparatus 130. In an example, the third mounting extension 364 has a width that is less than or equal to a space separating the first mounting extension 360 and the second mounting extension 362. As such, the third mounting extension 364 can be positioned between the first mounting extension 360 and the second mounting extension 362. In an example, the third mounting extension 364 can define an opening so as to receive a fastener, such as the third fastener 366, through the third mounting extension 364.

In operation, the third mounting extension 364 can be positioned in the gap, space, etc. between the first mounting extension 360 and the second mounting extension 362. The third fastener 366 can then be inserted through openings in the first mounting extension 360, the third mounting extension 364, and the second mounting extension 362. As such, the third fastener 366 can attach the reflective device 202 to the lighting apparatus 130. In this example, the reflective device 202 is movably attached with respect to the lighting apparatus 130. For example, the reflective device 202 can pivot about the third fastener 366, such as into and out of the page. This movement can allow for the reflective material 210 of the reflective device 202 to reflect light in a number of different directions, thus increasing the likelihood of an airborne animal visually detecting the reflected light.

It will be appreciated that in these examples, the lighting apparatus 130 can be attached to the attachment portion 104 or the reflective device 202. However, the lighting apparatus 130 is not so limited. Rather, in other examples, the lighting apparatus 130 can be attached to at least one of (e.g., either or both) the attachment portion 104 or the reflective device 202. In such an example, the power line protection device 100 may comprise at least two of the attachment portion 104, the lighting apparatus 130, or the reflective device 202. If the attachment portion 104 and the lighting apparatus 130 are provided, but the reflective device 202 is not provided, then the lighting apparatus 130 can be attached to the attachment portion 104. If the attachment portion 104 and the reflective device 202 are provided, but the lighting apparatus 130 is not provided, then the reflective device 202 can be attached to the attachment portion 104. If the lighting apparatus 130 and the reflective device 202 are provided, but the attachment portion 104 is not provided, then the reflective device 202 can be attached to the lighting apparatus 130, with the lighting apparatus 130 attached to the power line 102. Accordingly, in these examples, the reflective device 202 can be attached to at least one of (e.g., either or both) the attachment portion 104 or the lighting apparatus 130.

Figure 4:
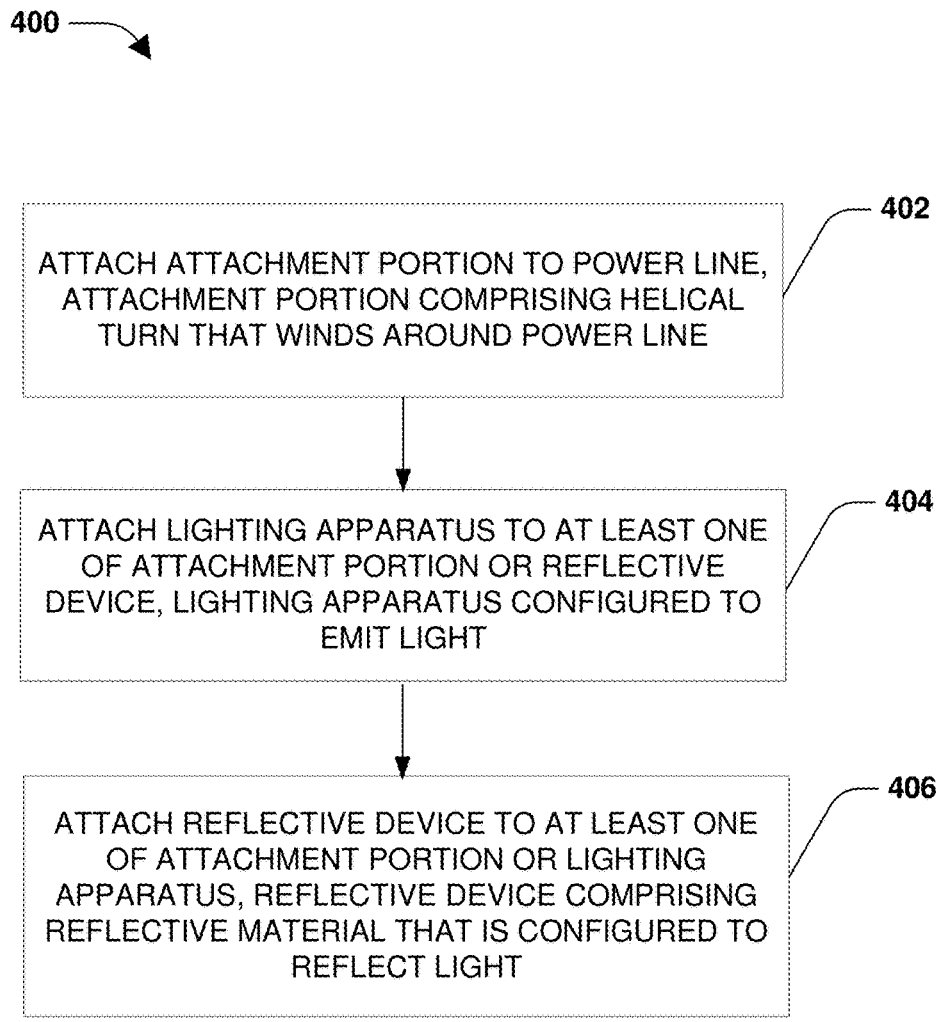
FIG. 4 is an illustration of an example method for protecting a power line from animals.

Turning to FIG. 4, an example method 400 for protecting the power line 102 from animals (e.g., avifauna such as birds, bats, and other flying creatures) is provided. At 402, the method 400 comprises attaching the attachment portion 104 to the power line 102, wherein the attachment portion 104 comprises one or more helical turns 106 that wind around the power line 102. At 404, the method 400 comprises attaching the lighting apparatus 130 to at least one of the attachment portion 104 or the reflective device 202, wherein the lighting apparatus 130 is configured to emit light. At 406, the method 400 comprises attaching the reflective device 202 to at least one of the attachment portion 104 or the lighting apparatus 130, wherein the reflective device 202 comprises the reflective material 210 that is configured to reflect light.

In this example, the power line protection device 100 can deter, warn, and otherwise repel animals, such as airborne animals, from coming into contact with the power line 102.

For example, during the day when light conditions are good, the helical turns of the attachment portion 104 and the second attachment portion 120 along with the reflective device 202 are visually perceptible by animals, such that animals may be deterred from going near the power line protection device 100 and, thus, avoiding the power line 102. When there is little to no light, such as at dawn, dusk, or at night, the lights 146 from the lighting apparatus 130 can emit light to divert the airborne animals from the power line protection device 100 and, thus, the power line 102.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component correspond to component A and component B or two different or two identical components or the same component.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean one or more unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A power line protection device for protecting a power line from avifauna, the power line protection device comprising at least two of:
   an attachment portion configured to be attached to the power line, the attachment portion comprising a helical turn that winds around the power line;
   a lighting apparatus configured to emit light; or
   a reflective device comprising a reflective material that is configured to reflect light,
   wherein the lighting apparatus is attached to the attachment portion, the reflective device attached to the lighting apparatus,
   wherein the lighting apparatus is configured to swing about a first axis and the reflective device is configured to rotate about a second axis,
   wherein the first axis and the second axis are not colinear.

2. The power line protection device of claim 1, comprising a second attachment portion configured to be attached to the power line, the second attachment portion comprising a second helical turn that winds around the power line.

3. The power line protection device of claim 2, wherein the lighting apparatus is attached to the attachment portion and the second attachment portion, the lighting apparatus positioned between the attachment portion and the second attachment portion.

4. The power line protection device of claim 1, wherein the reflective device is attached to the lighting apparatus such that the reflective device is disposed on a first side of the lighting apparatus and the attachment portion is disposed on a second side of the lighting apparatus.

5. The power line protection device of claim 1, wherein the reflective device comprises a central region and an outer region.

6. The power line protection device of claim 5, wherein the reflective material is disposed at the central region of the reflective device.

7. The power line protection device of claim 6, wherein the outer region of the reflective device comprises one or more openings.

8. The power line protection device of claim 1, wherein the reflective device is movably attached to the lighting apparatus.

9. The power line protection device of claim 1, wherein the lighting apparatus comprises a power source and one or more lights configured to be powered by the power source.

10. The power line protection device of claim 9, wherein the lighting apparatus comprises a solar panel that is configured to charge the power source.

11. A power line protection device for protecting a power line from avifauna, the power line protection device comprising:
    an attachment portion configured to be attached to the power line;
    a lighting apparatus configured to emit light; and
    a reflective device comprising a reflective material that is configured to reflect light,
    the lighting apparatus attached to the attachment portion, the reflective device attached to the lighting apparatus,
    wherein the lighting apparatus is configured to swing about a first axis and the reflective device is configured to rotate about a second axis,
    wherein the first axis and the second axis are not colinear.

12. The power line protection device of claim 11, comprising a second attachment portion configured to be attached to the power line, the second attachment portion comprising a second helical turn that winds around the power line.

13. The power line protection device of claim 12, wherein the lighting apparatus is attached to the attachment portion and the second attachment portion, the lighting apparatus positioned between the attachment portion and the second attachment portion.

14. The power line protection device of claim 11, wherein the reflective device is attached to the lighting apparatus such that the reflective device is disposed on a first side of the lighting apparatus and the attachment portion is disposed on a second side of the lighting apparatus.

15. The power line protection device of claim 11, wherein the reflective device comprises a central region and an outer region, the reflective material disposed at the central region of the reflective device.

16. The power line protection device of claim 15, wherein the outer region of the reflective device comprises one or more openings.

17. The power line protection device of claim 11, wherein the reflective device is movably attached to the lighting apparatus.

18. The power line protection device of claim 11, wherein the lighting apparatus comprises a power source and one or more lights configured to be powered by the power source.

19. The power line protection device of claim 18, wherein the lighting apparatus comprises a solar panel that is configured to charge the power source.

20. A method for protecting a power line from avifauna, the method comprising:
    attaching an attachment portion to the power line, the attachment portion comprising a helical turn that winds around the power line;
    attaching a lighting apparatus to the attachment portion, the lighting apparatus configured to emit light; and
    attaching a reflective device to the lighting apparatus, the reflective device comprising a reflective material that is configured to reflect light,
    wherein the lighting apparatus is configured to swing about a first axis and the reflective device is configured to rotate about a second axis,
    wherein the first axis and the second axis are not colinear.

* * * * *